Nov. 1, 1927.
J. F. JOHNSON
1,647,135
FLUID PRESSURE CONTROL
Filed Aug. 8, 1921
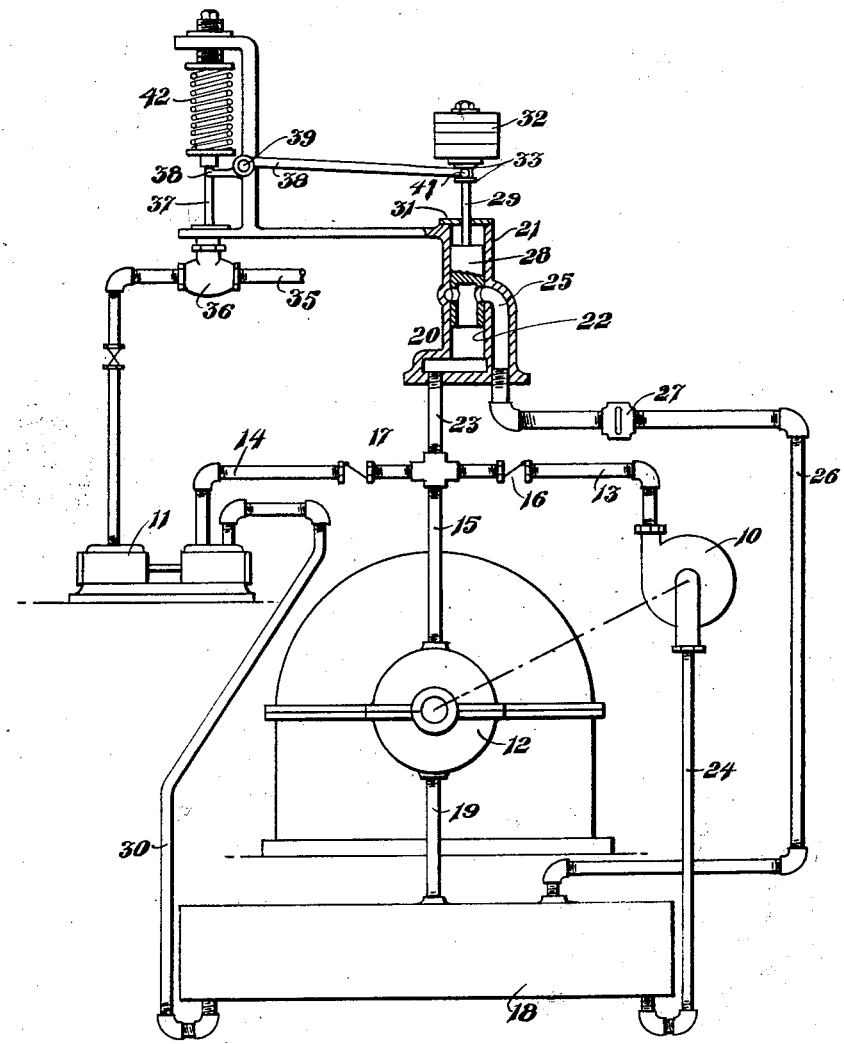
J. F. Johnson
INVENTOR
D. C. Davis
ATTORNEY Patented Nov. 1, 1927.

1,647,135

UNITED STATES PATENT OFFICE.

JOSIAH F. JOHNSON, OF SWARTHMORE, PENNSYLVANIA, ASSIGNOR TO WESTINGHOUSE ELECTRIC AND MANUFACTURING COMPANY, A CORPORATION OF PENNSYLVANIA.

FLUID-PRESSURE CONTROL.

Application filed August 8, 1921. Serial No. 490,749.

This invention relates to lubricating systems and more particularly to pressure lubricating systems for bearings and it has for an object the provision of apparatus of the character designated which shall be responsive to the pressure in the lubricating system to maintain an approximately constant predetermined pressure on the lubricant in the system.

It has for a further object the provision of apparatus associated with a fluid-pressure lubricating system which shall serve both to regulate the pressure of the lubricant in the system and to relieve the system of excess lubricant.

As an illustration of one form which my invention may take, reference may be had to the accompanying drawing in which the single figure is a diagrammatic view, partially in section and partially in elevation, of apparatus embodying my invention.

The present invention contemplates a pressure lubricating system for shaft bearings in which the lubricant, hereinafter, for convenience, termed oil, is supplied by a main pump and an associated auxiliary pump. Such a system is particularly adaptable to power-developing units such, for example, as steam turbines.

During normal operation, the main oil pump is employed to maintain approximately a predetermined oil pressure as, for example, five pounds per square inch, on the bearings. One difficulty heretofore experienced in installations of this character has been that a material drop in bearing oil pressure obtains upon starting and stopping the machine, especially if a rotary main pump is used, since the output of such a pump varies with the square of its speed. During starting or stopping, however, it is particularly desired to have an adequate supply of oil on the bearings to prevent scoring.

Furthermore, for a short period following starting, the oil has a lower temperature than the normal running temperature and does not flow as freely through the bearings, while the volume delivered by the pump is approximately constant. This results in the development of abnormally high back pressure. The purpose of my invention is to provide a coordinated regulator for the main pump and controlling mechanism for the auxiliary pump, by which the auxiliary pump may be operated in conjunction with the main pump to supply the requisite amount of oil to the bearings at a substantially constant pressure under all conditions of shaft speed and of oil viscosity. It is also a purpose of my invention to provide a pressure regulator which is easily kept in operable condition and which may be readily tested at frequent intervals.

Referring to the drawing for a more detailed understanding of my invention, I show a constant-pressure lubricating system for bearings in which 10 indicates the main oil pressure pump and 11 an auxiliary pump arranged to supply oil to the bearings of a machine 12, which may be a turbine, or a similar machine, requiring an approximately constant quantity of lubricant under a predetermined pressure.

The main pump 10 is directly driven as from the shaft of machine 12 and may be a rotary pump, which type of pump is particularly adapted to the requirements of pressure lubrication. The auxiliary pump 11 is driven from an independent source of power and may be a reciprocating motive-fluid pump, such as an ordinary steam pump. Oil is conducted to the machine 12 from the main and auxiliary pumps 10 and 11 by conduits 13 and 14 which deliver into a conduit 15. The conduits 13 and 14 are provided with check-valves 16 and 17 to prevent the back flow of oil therethrough. Oil drained from the bearings is conducted to a suitable reservoir 18 by gravity through the conduit 19 and oil from the reservoir is conducted to the pumps 10 and 11 through conduits 24 and 30, respectively.

To enable the main and auxiliary oil pumps to cooperate effectively, I interpose a regulator 20 in the bearing oil supply system. The regulator 20 comprises a casing 21 in which is located a cylindrical chamber 22, the lower portion of which is connected to the bearing oil supply by a conduit 23. The upper end of the chamber 22 is connected to the atmosphere. The casing 21 is also provided with a passage 25, communicating with the chamber 22, which constitutes a by-pass for excess oil supplied to the system by the pump 10. Oil flowing through the by-pass is conducted to the oil reservoir 18 by a conduit 26 which may have provided therein a sight glass 27 to enable the operator to see the amount of oil overflowing from the system. Located within the cylinder 22 is a piston 28 provided with a stem member 29 projecting upwardly through a cover 31 for the chamber 22. The piston 28, which closely fits the chamber 22, is subjected to the pressure of the oil in the system, which urges the piston in an upward direction. The stem 29 is provided at its upper extremity with suitable means, such as weights 32, which opposes upward movement of the piston 28. The stem 29 is also provided at a point below the weights with a pair of spaced shoulders 33 which constitute stops for a purpose which will presently appear.

Motive fluid admitted to the auxiliary pump 11 through the conduit 35 is controlled in any suitable manner, as for example, by a balanced valve 36. The valve 36 is actuated by a stem portion 37, which is connected to a rocker lever 38, pivoted at 39. The other end of the rocker lever 38 is provided with a fork 41 embracing the stem 29 and engaging between the spaced stops 33, thus forming a lost motion connection therewith. It is apparent that the stem 29 is freely rotatable between the fork 41. By the occasional rotation of the stem 29 the operator of the apparatus is insured that the piston 28 is not sticking in its cylinder 22, this action permitting substantially frictionless vertical movement of the piston, as in the ordinary gauge-testing operation.

The valve stem 37 is urged in a direction to close the valve 36 by any suitable means, such as a spring 42. The spring 42 serves to effect positive closing of the valve 36 when permitted to do so by the rocker lever 38.

The operation of the above described apparatus is as follows: When the shaft of the machine 12 is rotating at normal speed, the pump 10 is delivering oil under pressure to the shaft bearing through the conduit 15, and to the chamber 22 through the conduit 23, thus causing the piston 28 to rise against the action of weights 32 an amount determined by the pressure in the chamber. The weights 32 are so chosen that under normal operating conditions, the piston uncovers the entrance to passage 25, allowing the excess oil pumped to return to the reservoir 18 through the conduit 26; the amount of oil so by-passed being visible through the sight-glass 27.

When, for any reason, the pressure of the oil delivered by the main pump diminishes, the weights 32 force the piston 28 downwardly and close the by-pass 25. Should the piston 28 continue to move downwardly, the upper stop 33 on the stem 29 contacts with the fork 41 on the lever 38 and moves it downward against the action of the spring 42. This raises the valve stem 37 of the balanced valve 36, thereby admitting motive fluid to the auxiliary pump 11, and causing said pump to start up and deliver oil to maintain the pressure within the system.

As the auxiliary pump restores the oil pressure within the system, the piston moves upwardly and the spring 42 assists in positively closing the auxiliary pump valve 36. During the operation of starting or stopping the machine 12, when the speed of the main pump is too low to maintain a sufficient volume of oil on the bearings, the valve 36 is wide open and the auxiliary pump 11 supplies, in consequence, the deficit of oil. After the machine 12 has come to rest, the pump 11 can be shut down in any well known manner, as by closing a manual valve in the motive fluid supply pipe thereto.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:—

1. In combination in a lubricating system, a main pump, an auxiliary pump associated with the main pump to maintain a constant pressure in the system, and means responsive to the pressure changes in the system for causing excess lubricant to by-pass and to automatically start the auxiliary pump upon a diminution of pressure in the system.

2. In combination in a lubricating system, main supply means to supply lubricant to the system, an independently-driven auxiliary means associated with the main supply means to maintain a constant pressure in the system, means for by-passing excess fluid delivered by the main supply means, and means for starting the auxiliary supply means on a diminution of pressure by a predetermined amount.

3. In a lubricating system having main supply means to supply lubricant to the system at varying pressures and independent auxiliary supply means associated with the main supply means to maintain a substantially constant pressure in the system, means responsive to the pressure in the system for relieving any excess fluid pressure caused by the main supply means and for introducing lubricant from the auxiliary supply means into the system upon a diminution of pressure in the system.

4. In combination in a lubricating system, main supply means to supply lubricant to the system, an auxiliary supply means associated with the main supply means to maintain a constant pressure in the system, a pressure relief by-pass valve for the main supply means and control means associated with the by-pass means to effect operation of the auxiliary supply means when the flow of fluid through the by-pass diminishes a predetermined amount.

5. In a constant fluid pressure system comprising a main supply means and an auxiliary supply means, a pressure controlled by-pass valve associated with the main supply means and means associated with the by-pass valve for positively controlling the auxiliary supply means to maintain a constant pressure in the system.

6. In a constant fluid pressure system comprising a main supply means and an auxiliary supply means, a control mechanism for regulating the output of the auxiliary supply means in accordance with the pressure maintained in the system by the main supply means, and means associated with the control mechanism for by-passing excess fluid.

7. In a constant fluid pressure system having a main supply means and an auxiliary supply means, a control mechanism for the system including a chamber in communication with the lubricating system, a fluid actuated piston in the chamber, and means communicating with the chamber and controlled by the piston to discharge the excess output of the main fluid supply means.

8. In a pressure lubricating system, in combination, a main pump, an auxiliary pump associated therewith and independently driven, a pressure relief by-pass valve including a reciprocatory piston and means operated by said piston to control the auxiliary pump whereby an approximately constant pressure is maintained in the system.

9. In a fluid pressure system having a main pump and an auxiliary pump associated therewith, in combination, pressure relief means including a piston subjected to pressure in the system, a by-pass controlled by the piston and means actuated by the piston to control the operation of the auxiliary pump to maintain approximately constant pressure in the system.

10. In a constant fluid pressure system having a main supply means, an auxiliary supply means, a control device for the auxiliary supply means, and a regulator for the system comprising a casing chamber communicating therewith, a movable fluid actuated piston in the casing, a fluid by-pass for the system communicating with the casing and controlled by the piston, and means including a lost motion connection actuated by the piston to operate the control device for the auxiliary supply means.

11. In a control device for a constant fluid pressure system including a main pump and an independently driven auxiliary pump, a fluid by-pass valve comprising a reciprocatory piston, means balancing the piston against the fluid pressure of the system, and control means including a balanced valve for the motive fluid of the auxiliary pump, said control means being operated by the piston through a lost motion connection.

12. In a fluid pressure lubricating system for rotary shaft bearings, in combination, a rotary pump driven from the shaft, an independently driven auxiliary pump normally inoperative, and control means responsive to fluid pressure in the system, whereby excess fluid is by-passed at normal pressure and the auxiliary supply means is placed in operation on diminishing pressure.

13. In a fluid pressure lubricating system, in combination, a main rotary pump, an auxiliary reciprocatory pump independently driven and normally inoperative, control means responsive to fluid pressure in the system including a by-pass for excess fluid and means actuated by the control means to place the auxiliary pump in operation on a predetermined diminution of pressure.

14. In a fluid pressure system, in combination, a main pump, an auxiliary pump driven from an independent source of power, a pressure regulator directly controlling the maximum pressure in the system, and means actuated by the regulator and controlling the input of power to the auxiliary pump to maintain approximately constant pressure in the system.

15. In a shaft bearing lubricating system, a main pump driven from the shaft that is lubricated, an auxiliary pump driven from an independent source of power and means responsive to lubricant pressure controlling the supply of power to the auxiliary pump.

16. In a shaft-bearing lubricating system, a main pump driven from the shaft that is lubricated and capable of maintaining a predetermined pressure at normal speeds, an independently driven auxiliary pump to maintain the predetermined pressure at low shaft speeds and automatic pressure-responsive means controlling the auxiliary pump whereby the predetermined pressure is approximately maintained at all shaft speeds.

In testimony whereof, I have hereunto subscribed my name this second day of August, 1921.

JOSIAH F. JOHNSON.